Figure 1:
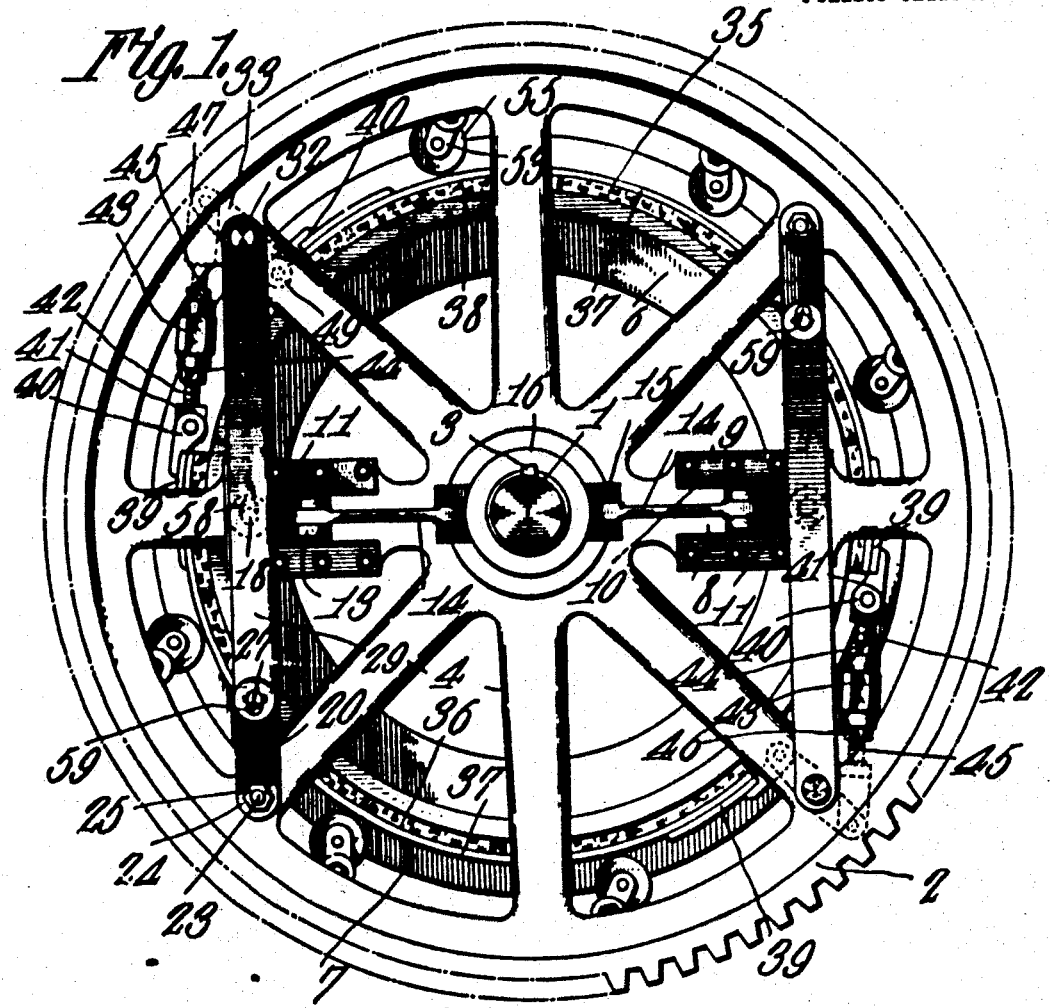

T. O. WERNER.
FRICTION CLUTCH.
APPLICATION FILED JAN. 29, 1908.

No. 898,946.

Patented Sept. 15, 1908.
2 SHEETS—SHEET 1.

Inventor
Thomas O. Werner

Witnesses

By C. A. Snow & Co.
Attorneys

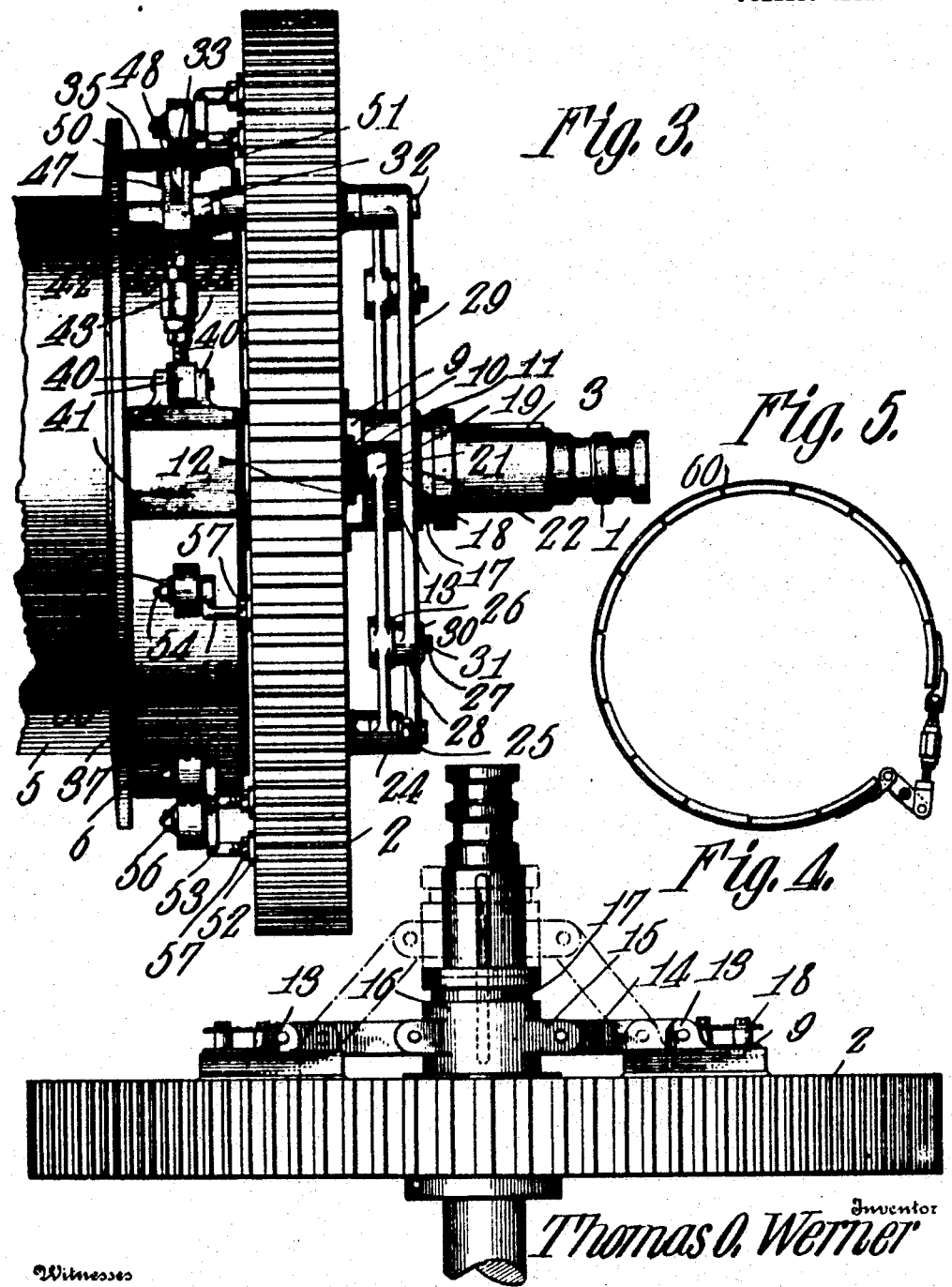

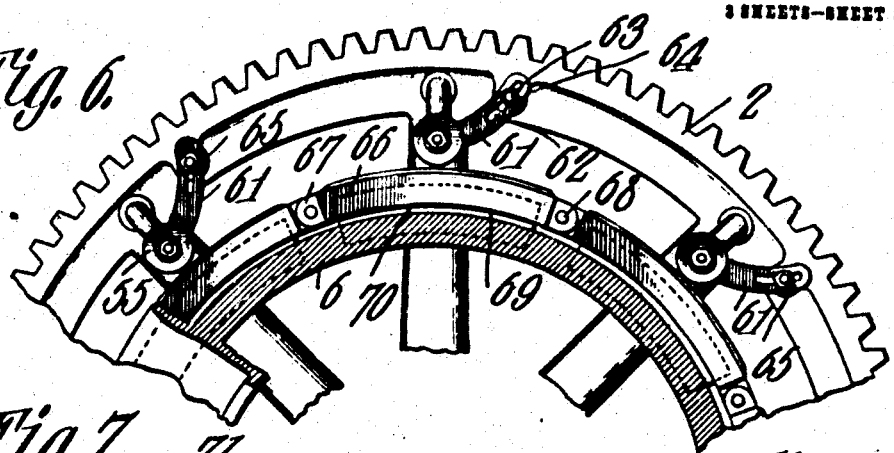

UNITED STATES PATENT OFFICE.

THOMAS ODENWELDER WERNER, OF BANGOR, PENNSYLVANIA.

FRICTION-CLUTCH.

No. 898,946.　　　　Specification of Letters Patent.　　　Patented Sept. 15, 1908.

Application filed January 29, 1908. Serial No. 413,225.

*To all whom it may concern:*

Be it known that I, THOMAS ODENWELDER WERNER, a citizen of the United States, residing at Bangor, in the county of Northampton and State of Pennsylvania, have invented a new and useful Friction-Clutch, of which the following is a specification.

This invention has reference to improvements in friction clutches, and its object is to provide a means whereby great clutching power may be established between the drive and driven members at the expenditure of a comparatively small initial force.

The invention comprises a drive member and a driven member, and upon one of these members there is carried a drum and upon the other member there are carried friction shoes segmental in shape so as to conform to the contour of the drum, and these shoes are interconnected through a lever and link system to a sliding sleeve which may be moved longitudinally through the usual collar and fork connections from any suitable means of manipulation such, for instance, as a manipulating lever. The sliding sleeve is connected by toggle links to radially-movable members on opposite sides of the center of one of the friction members, and these radially movable members are connected to levers fulcrumed to one of the rotatable members of the clutch, and the levers in turn are connected by rock-arms to rock-shafts and the latter are provided with oppositely-projecting arms each in turn connected to opposite ends of the friction shoes, so that when the rock-shafts are rotated the shoes are contracted upon the friction drum and so the two friction members are coupled together. The parts may be so adjusted that when moved to a clutched position the several levers and links are brought into alinement and are thereby locked against movement when the device is used as a friction clutch, but when the device is used as a brake some play of the parts is desirable. Means are also provided for adjusting the parts to take up wear and to prevent the friction shoes from moving away from the drum more than a very limited distance so that should the parts continue to rotate after the friction shoes are relieved from the action of the manipulation mechanism these shoes will be prevented from moving outward under the action of centrifugal force, except for a very limited distance sufficient to permit them to move out of operative engagement with the drum.

The invention will be best understood from a consideration of the following detail description taken in connection with the accompanying drawings forming a part of this specification, in which drawings,—

Figure 2:
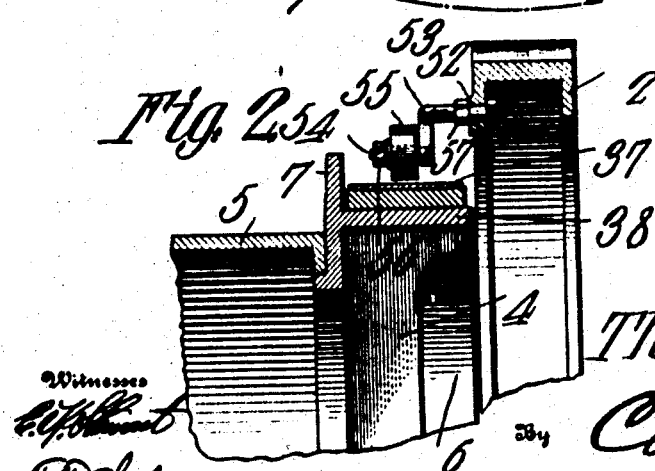

Figure 1 is a face view of a friction clutch constructed in accordance with the present invention. Fig. 2 is a section through a portion of the same to show the means for preventing the friction shoes from moving more than a limited distance from the friction drum. Fig. 3 is a side elevation of the clutch. Fig. 4 is a side view of the clutch at a different point of view than in Fig. 3, parts being omitted and different phases of the operation of the clutch being indicated. Fig. 5 is a view showing a single clutch or brake band. Fig. 6 is an elevation, partly in section, showing another form of clutch band and distance-roller supports. Figs. 7 to 12 are detail views.

In the following description one member of the friction clutch will be referred to as the drive member and the other will be referred to as the driven member, with the understanding, however, that the order of transmission of power may be reversed without in any manner affecting the operation of the invention, and the reversibility of the structure so far as the invention is concerned is to be understood even though in the following description and claims the terms "drive member" and "driven member" be limited each to a particular one only of the two members of the clutch.

Referring to the drawings, there is shown a shaft 1, upon which is mounted a gear wheel 2, the gear being shown as keyed to the shaft by means of a suitable key 3. The gear wheel 2, which is, however, to be taken as indicative of any other suitable member may be replaced by a disk or other structure. Also the gear or other member replacing it need not necessarily be keyed to the shaft. In the following description and in the claims this part of the device will be designated the "drive member". The member 2, as shown, is a gear of the open or spider type having its rim and hub joined by spokes 4. Upon the shaft 1 there is also mounted a winding drum 5 which may be taken as the driven member, and indicative of any other structure to which power is to be applied through the friction clutch or the drum may, under some circumstances, constitute the drive member. The drum 5 may be free to rotate upon the shaft 1, or may be keyed thereto when the other clutch member is free to rotate on the shaft. Formed at one end of the winding drum 5 is another drum 6 which may be of somewhat greater diameter than the winding drum and is separated therefrom by an annular flange 7.

As shown in the drawings, two diametrically opposite spokes 4 have formed thereon about midway of their length expanded portions 8 to each of which are secured two guide strips 9, each formed with an overhang 10, said guide strips 9 being spaced apart with their overhangs facing one another and arranged parallel for the reception of a block 11 capable of longitudinal movement between the guide strips and held in place by the overhanging portion 10 which engages suitable channels 12 formed in the sides of the block. In small structures these guide strips may be omitted and slots in the spokes will answer. Any other means for permitting longitudinal guided movement of the blocks 11 may be provided, and any number of blocks and cooperating parts may be used, there being more than two blocks employed in large structures. Each block has formed in its upper face a pair of ears 13, to which is pivoted one end of a toggle link 14, the other end of which is pivotally connected between a corresponding pair of ears 15 formed on the periphery of a sleeve 16 movable longitudinally on the shaft 1 but which may be, if desired, constrained to rotate therewith by means of the key 3 which engages a suitable keyway in the sleeve. For small structures the links alone will be sufficient to cause the rotation of the sleeve, and when the driving member is not keyed to the shaft, the sleeve 16 is also not keyed to the shaft. Formed in the sleeve near one end thereof is an annular channel 17 for the reception of the usual ring under the control of a fork and connected to an operating lever in the manner customary in structures of this character. Since these last-named parts may be of the ordinary construction and in themselves form no part of the present inventon, they have been omitted from the drawings.

As will be readily seen from an inspection of Fig. 4, when the sleeve 16 is moved toward the gear-wheel 2 then the blocks 11 are forced radially outward in the guideways 9, and when the sleeve 16 is moved away from the gear wheel then these blocks are drawn toward the axis of the shaft. Each block has formed thereon a pintle 18 constituting a journal for the reception of an eye 19 formed on one end of a lever 20. This eye 19 of the lever is held in place by a washer 21 and a cotter pin 22, or any other suitable means of securing the parts against accidental displacement may be used. The other end of each lever 20 is connected to a stud 23 formed on the next adjacent spoke 4 to the one carrying the particular block 11 under consideration. In the drawings this end of the lever 20 is shown as secured in place by a washer 24 and nut 25 applied to the stud 23. Near that end of the lever 20 mounted upon the stud 23 the lever is formed with an enlargement 26 carrying a stud 27 which in turn receives an eye 28 formed on one end with an arm 29 and held in place by a washer 30 and a cotter pin 31, or in any other manner. The other end of the arm 29 is fast on a rock-shaft 32 having journal bearings in that spoke 4 located on the other side of the spoke carrying the sliding block from the spoke carrying the stud 23. This rock-shaft 32 extends entirely through the gear wheel, and upon the opposite end to which the arm 29 is secured, this rock-shaft has two projecting arms 33 and 34.

Referring now to the friction drum 6, this drum has applied to its surface two friction shoes 35 and 36 each composed of a metallic band 37 carrying a number of segmental bearing blocks 38 of wood or other suitable material, which under some circumstances may be made of metal. The blocks 38 constitute a wearing face for the shoe and are to be considered reversible when shown. Fast to each end of each shoe is a plate 39 terminating in ears 40. Between the ears 40 on one plate 39 is pivoted an eye 41 formed on one end of a threaded rod 42 entering a turn buckle 43 and also carrying a lock-nut 44. The turn buckle 43 has its other end entered by a threaded rod 45 carrying a lock nut 46, and this threaded rod terminates in two ears 47 receiving an eye 48 formed on the end of the rock-arm 33. The ears 40 on the plate 39 at the other end of each shoe receive an eye 49 formed on the end of the rock-arm 34. The pivotal connections between the several parts are formed by suitable pins which may be headed pins, as indicated at 50, and these pins may be held in place by cotter pins 51 or in any other manner.

On the inner face of the gear wheel 2 are formed bosses 52 which may be suitably tapped to receive the threaded ends of angle rods 53 carrying pintles 54 at their free ends parallel with the main body of the respective rods 53, and these pintles each have journaled thereupon a roller 55. The pintles may be suitably threaded to receive nuts 56 for holding the rollers in place, or any other suitable means may be used for this purpose. The rollers are adjustable to and from the metallic face of the shoes since they are mounted eccentrically to the axis of the rods 53, and when these rollers have been properly adjusted they may be locked in the adjusted position by lock nuts 57 upon the threaded ends of the rods contiguous to the bosses 52. The rollers will rest in the path of the shoes 35 and 36 about midway of their width and disposed at several points about their peripheries, and in practice the adjustment of these rollers is such that the shoes may move slightly away from the face of the drum 6 so that the drum may be free to rotate if so desired, without wearing the blocks 38 when the drum is unclutched from the drive member.

Let it be assumed that the gear wheel 2 is representative of the drive member of a hoisting mechanism and that the winding drum 5 receives the hoisting rope or cable. Let it further be assumed that power is being constantly applied to the gear wheel 2 and that the latter is rotated. Now, when the sleeve 16, which when the clutch is inoperative is in the dotted line position shown in Fig. 4, is moved toward the gear wheel by means of a suitable manipulating lever, which as before stated is not shown in the drawings. As the sleeve 16 is moved toward the gear wheel the toggle action of the levers or links 14 will move the blocks 11 radially outward toward the periphery of the gear wheel. The levers 20, have their ends connected to the pintles 18 which also move outward toward the periphery of the gear wheel. In order to make the changed relation between that end of the lever connected with the block and the said block, the eye 19 is formed with a slot 58. The movement of each lever 20 about the stud 23 toward the periphery of the gear wheel causes a corresponding movement of the free end of the rock arms 29 in the same direction, and these rock arms cause a corresponding rotative movement of the rock-shafts 32 which in turn move the rock-arms 33 and 34 in a direction to cause the corresponding ends of the shoes to approach each other. These movements tend to reduce the effective diameter of the arcs described by the shoes, and these shoes are therefore brought into frictional contact with the periphery of the drum 6. The eye 30 in each arm 29 is formed with a slot 59 to accommodate it to the different arc-shaped paths through which each eye 30 and the corresponding stud 27 pass.

The leverage of the arm 29 upon the shaft 32 is largely in excess of that of the rock-arms 33 and 34 and consequently a great force is exerted upon the shoes to draw them into contact with the periphery of the drum 6 by the movement of the arms 29 in the proper direction. These arms are moved in the operative direction by the levers 20 and here again is a considerable gain in power. The levers 20 are in turn moved by the toggle links 14, and once again there is a marked gain in power over the initial force applied to the operating lever. For these reasons very little force need be initially exerted in order to bring to bear upon the shoes 35 and 36 such compressive force upon the drum 6 as to hold them in any adjusted degree of frictional contact. It is therefore possible to the operator to couple the driving member to the driven member through the friction clutch in such manner as to provide for the transfer of great power from one member to the other, with an exertion by the operator of but little force and far less than is necessary with friction clutches such as are commonly employed for the purposes to which this invention is applicable. When the friction members are in the engaged position the links 14 are in line one with another in opposition to any force tending to move the blocks 11 toward the shaft 1, and consequently the clutch is then locked in the engaged position against accidental displacement.

It has been stated that the drum 6 may be formed in one piece with the drum 5, but in Fig. 2 these parts are shown as formed in two pieces which may be the preferable construction since the outer periphery of the drum 6 is liable to wear and it may be necessary from time to time to replace this drum, which can be done much more cheaply when the drum 6 is made separate from the drum 5. The two drums may be connected together for synchronous rotation. The shoes 35 and 36 are in effect flexible straps connected at opposite ends to the rock-arms 33 and 34 so as to be moved toward each other and so grip the outer periphery of the drum 6.

In Fig. 5 there is shown but one friction strap designated by the numeral 60, and this strap extends substantially all the way around the member to which it is applied although that member is omitted in the drawings. The strap 60 in the form shown in Fig. 5, may be used either for the transmission of power from a drive to a driven member or as a brake strap since the invention may be employed for the ordinary purposes of a friction clutch or for purposes of slowing down or stopping the member already in rotation.

Instead of locking the rollers 55 in the manner described with reference to Figs. 1 to 4, they may be mounted as shown in Figs. 6 and 8, where the angle rods have applied to them close to the roller a strap 61 appropriately bent and having one end slotted, as shown at 62, for the reception of a pin or belt 63 to which is applied a nut 64, or the bolt 63 and nut 64 may be replaced by an ordinary set or cap screw. The pin or bolt is fast on a boss 65 formed on the inner periphery of the gear 2 or other member which may be used in place of a gear. By means of the straps 61 the pintles of the rollers may be adjusted about their point of support in the gear wheel or other like structure and their relation to the friction strap or straps be thus fixed, as desired.

In Figs. 6, 7 and 9, the friction strap is shown differently constructed than in Figs. 1 to 4. In this case there are formed segmental frames 66 terminating at each end in eyes 67 so arranged that the end of one frame may be coupled to the meeting end of the other frame by means of pins 68 or other suitable connecting devices, so that the friction band is made up of a number of segmental links pivoted together. The frames 66 have inwardly-directed radial side flanges 69 against which bear friction blocks 70 held in place by plates 71 formed with stud screws 72 in line one with the other and receiving turn buckles 73 by means of which the blocks 70 may be contracted or expanded to a limited extent. In this case the rim of the member 6 is formed with a circular groove 74 having the inner walls 75 of the sides of the groove divergent, as shown, while the corresponding portions of the blocks 70 are beveled so as to present the requisite amount of friction surface without necessitating a wide flat band, as would be necessary with large friction units.

In Fig. 10, the friction blocks 70 are held to the frame 66 by set screws 76 and are adjustable toward each other to grip a beveled flange 77 formed on the outer face of the member 6.

In Fig. 11, the friction blocks or shoes 78 are formed on one piece with a central beveled groove 79 fitting the beveled flange 77, but in this case there is no provision for lateral adjustment for the taking up of wear.

In Fig. 12, the member 6 is formed with a beveled groove 80 similar to the groove 74 of the structure of Fig. 9, and the friction block or shoe 81 is shaped to engage the groove 80.

Several examples of the forms of friction blocks are given to show that the invention is not to be all limited to one particular form of friction block or friction shoe, but this may be changed in a great variety of ways and may be shaped differently than any of the examples given without in any manner departing from the invention. Nor is it necessary that blocks of different material than the framework of the shoe be used. It is preferable, however, that the link form of friction shoe be employed and especially in large structures the shoe will be shaped with the beveled engaging face. Where the link form of friction shoe is employed, there is a limiting roller 55 for each shoe, thus keeping them at an equal distance from the member they are designed to engage. It is also within the scope of the invention to use bolts in place of the pins or studs mentioned throughout the specification, or any other suitable means for connecting the parts is to be employed if so desired.

When the device is used as a brake the "drive member" then no longer performs the function of a prime mover for the other member but will be a fixed structure, while the "driven member" is then the member to be controlled or stopped by the brake. Of course the relation of the parts may be changed so that the moving member which is to be slowed down or stopped will carry the friction shoes and the parts controlling the same, while the fixed member may be simply in the form of a fixed drum or other shaped structure with which the friction shoes may be brought into engagement to slow down or stop the other member. Again, when the device is used as an ordinary friction clutch, either member may carry the friction shoes and parts controlling the same, whether that member be the driving member or the driven member. The term "clutch" is to be understood as applicable to either a friction clutch where power is transferred from one member to another member or to a brake where a moving member is frictionally clutched to a stationary member to control or stop the movement of the moving member.

What is claimed is:—

1. A friction clutch comprising a drive member, a driven member, friction shoes or straps encircling the driven member, rock-shafts carried by the drive member, rock-arms on the rock-shafts connected to the contiguous ends of the friction shoes or straps, another rock-arm for each rock-shaft, a lever for each last-named rock-arm and carried by the drive member, radially sliding blocks carried by the drive member and each connected to one of the levers, a sliding sleeve upon the drive member, and a toggle link between the sleeve and each sliding block.

2. A friction clutch comprising a drive member, a driven member, friction straps or shoes encircling the driven member, rock-shafts upon the drive member, rock-arms upon each rock-shaft, one rock-arm being connected directly to one end of one of the friction straps, adjustable connections between each of the other rock-arms and the corresponding ends of the friction straps, another rock-arm on each rock-shaft, a lever for each rock-arm having a pivot support on the driven member, and connected to the last-named rock-arm at an intermediate point in the length of the lever, radially sliding blocks on the driven member connected to the ends of the levers remote from their pivot points, a sleeve movable to and from the driven member, and toggle links between the sleeve and the sliding blocks.

3. In a friction clutch, a means for operating the friction members comprising rock arms connected to the friction members, a lever for each rock arm, said lever being carried by one clutch member and at an intermediate point connected to the end of the rock arm, radially sliding blocks one for each lever and connected thereto at the end remote from its point of connection with the clutch member, and means for moving said radially sliding blocks to actuate the clutch.

4. In a friction clutch, a means for operating the friction members comprising rock shafts connected to the friction members, rock arms on the shafts, a lever for each rock arm carried by one of the clutch members at one end and movable about the point of connection as a fulcrum, said lever being connected to its rock arm at a point closer to the fulcrum than to the other end of the lever, a radially sliding block for each lever and connected to the free end thereof, a sliding sleeve on the clutch member carrying the levers, and a toggle link between each sliding block and the sleeve.

5. In a friction clutch, a drive member, a driven member in the form of a drum, straps or shoes encircling the drum, and stops on the drive member exterior to and in operative relation to the straps or shoes, said stops each consisting of a roller, a rotatable mounting upon which the roller is supported eccentrically, and means for locking the mounting in any position of adjustment comprising a curved slotted strap connected at one end to the roller mounting and at the other end held adjustably by a securing means extending through the slots.

6. A clutch comprising two rotatable members, friction shoes carried by one member in operative relation to the other member, said friction shoes having friction blocks adjustable in a direction parallel with the axis of rotation of the clutch members, and the other member being shaped to receive the thrust of the friction blocks, and means for adjusting the shoes to the other member.

In testimony that I claim the foregoing as my own, I have hereto affixed my signature in the presence of two witnesses.

THOMAS ODENWELDER WERNER.

Witnesses:
 THOMAS K. LEWIS,
 J. WILLARD PAFF.